United States Patent [19]

Reinauer

[11] Patent Number: 4,676,702

[45] Date of Patent: Jun. 30, 1987

[54] DRILL WITH NOVEL INSERT

[75] Inventor: Joseph Reinauer, Sigmaringen, Fed. Rep. of Germany

[73] Assignee: Guhring, Inc., Brookfield, Wis.

[21] Appl. No.: 872,890

[22] Filed: Jun. 11, 1986

[51] Int. Cl.⁴ .............................................. B23B 51/00
[52] U.S. Cl. .................................... 408/144; 408/188; 408/713
[58] Field of Search ............... 408/144, 188, 196, 225, 408/224, 223, 230, 713; 407/54

[56] References Cited

U.S. PATENT DOCUMENTS 4,230,429 10/1980 Eckle .............................. 408/223 X

FOREIGN PATENT DOCUMENTS 2044012 5/1979 Fed. Rep. of Germany ...... 408/144

Primary Examiner—Z. R. Bilinsky
Attorney, Agent, or Firm—Tilton, Fallon, Lungmus & Chestnut

[57] ABSTRACT

An insert for a drill including a carbide body having a generally polygonal perimeter with three pairs of sides, the sides of each pair being of an equal length.

3 Claims, 10 Drawing Figures

DRILL WITH NOVEL INSERT

BACKGROUND AND SUMMARY OF INVENTION

This invention relates to a drill with insert and, more particularly, to a novel carbide insert having a unique perimeter consisting of six sides.

Inserts of this general type can be seen in U.S. Pat. No. 4,230,429 wherein the six sided insert has six equal sides arranged in three pairs. This type of insert is subject to the limitation of being used in only short length bores. The invention is based upon the discovery that the provision of unequal length sides in each pair, the forces operating on the bit are better balanced and therefore a longer bore hole can be achieved.

The invention is described in conjunction with the accompanying drawing, in which FIG. 1 is an elevational view of the elongated drill;

DETAILED DESCRIPTION

Figure 1:
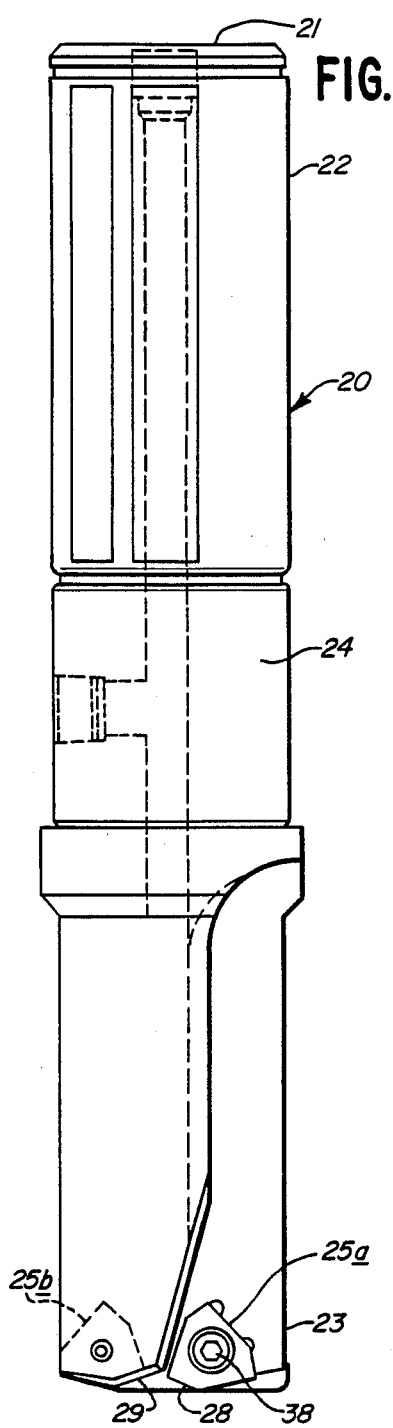

In the illustration given and with reference first to FIG. 1, the numeral 20 designates generally a drill which is seen to be relatively elongated and generally cylindrical having an axis of rotation 21. The upper end 22 is the mounting end which can assume conventional configuration and attention is directed toward the lower end 23 which is the work end and which incorporates the novel inserts of the invention.

Figure 2:
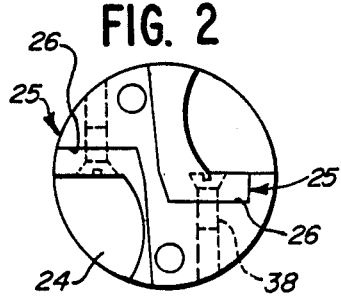
FIG. 2 is an end view of the drill of FIG. 1.
Figure 7:
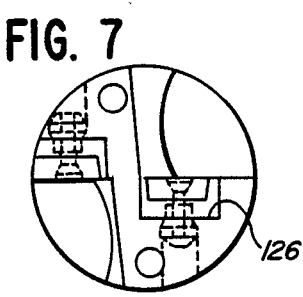
FIG. 7 is an end view of the drill of FIG. 6.

Referring now to FIG. 2, the working end of the drill is seen and provided in the outer wall and facing outwardly are flutes 24 and the inventive inserts generally designated 25. The inserts are mounted within recesses 26 which are generally radially extending and arranged generally diametrically of each other.

Figure 3:
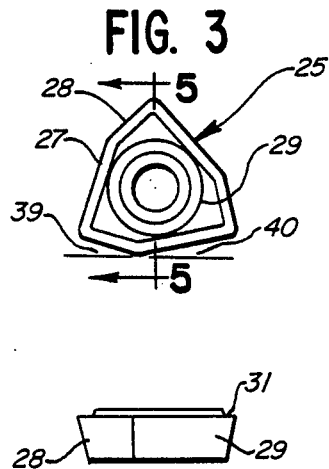
FIG. 3 is an enlarged front elevational view of one of the inserts seen at the bottom of FIG. 1.

Referring now to FIG. 3, the inventive insert 25 is seen to have a generally polygonal perimeter consisting of six sides. The six sides are arranged in three pairs with each pair having a longer side 27 and a shorter side 28. As can be appreciated from a consideration of the lower part of FIG. 1, the shorter side of each insert is arranged adjacent the axis 21. The inserts 25 are arranged with one insert 25a slightly overlapping the axis and the other insert 25b spaced from the axis with its outer corner forming the wall of the bore hole.

Figure 5:
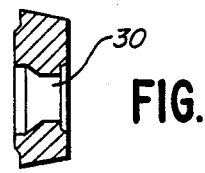
FIG. 5 is a sectional view taken along the sight line 5—5 applied to FIG. 3.

Again referring to FIG. 3, the longer sides 27 are arranged to be tangent to an inscribed circle 29. For convenience of mounting, a mounting hole 30 (see FIG. 5) is provided at the center of the inscribed circle 29.

Figure 4:
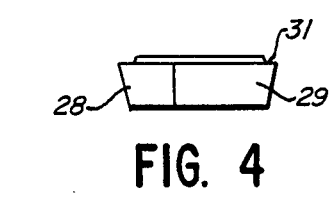
FIG. 4 is a side elevational view of the insert of FIG. 3.

Advantageously the cutting edges of the sides 27 and 28 are relieved as at 31 (see FIG. 4) which provide a space for the tight curling and quick breaking of the drill chips developed by the rotation of the drill 20.

Reference is now made to an alternative embodiment of the invention which is seen in FIGS. 6-10 and which is employed for the larger diameter drills. For example, the embodiment of FIG. 1 can be used advantageously for drills having diameters of the inscribed circle 29 up through about ⅜" whereas the embodiment of FIGS. 6-10 is advantageously employed with inscribed circles having diameters of ½" or more. Again, however, the insert 125 is identical to that previously described with the only change being a slightly greater thickness in the plate-like body. For example, with the embodiment having a 3/16" diameter inscribed circle, the thickness is about 2.4 mm. whereas with a ½" inscribed circle size, the thickness is about 5.3 mm.

Figure 8:
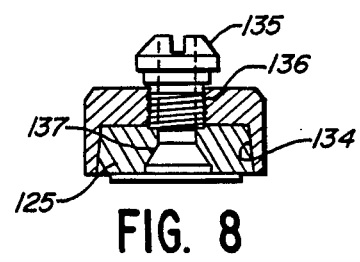
FIG. 8 is an enlarged sectional view of the cartridge seen in FIG. 7.

For the larger sizes a cartridge generally designated 132 is provided for each insert and the recess 126 is correspondingly enlarged and reshaped to accommodate the cartridge 132. The cartridge 132, as seen in FIG. 8, includes a member 133 which is equipped with a recess 134 for receiving the insert 125. As can be appreciated from a comparison of FIGS. 6 and 8, the member 133 is closed on three of its sides but has the recess accessible or open at the front or bottom for the protrusion of the cutting sides of the insert 125.

The cartridge 132 also includes a lock 135 (see also FIGS. 9 and 10) which is threadably received within the member 133. The lock 135 is counterbored at 136 for receiving the locking screw 137 corresponding to the locking screw 38 of the embodiment of FIGS. 1 and 2.

As a specific example of the invention, the obtuse angle included between the sides 27 and 28 is 154° while the actue angle included between the longer and shorter sizes is 86°. This permits the mounting of the insert within a recess to have a 16° angle at 39 and a 10° at 40—see FIG. 3—where the angles are measured to the cutting plane. Where, however, the recess is oriented somewhat differently as by being rotated 1°, these angles will change accordingly.

OPERATION

Figure 6:
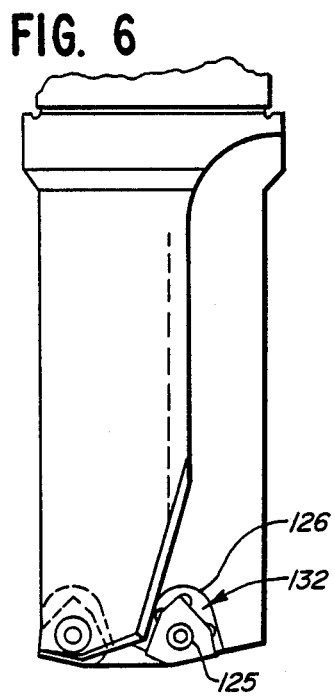
FIG. 6 is a fragmentary elevational view of a modified form of drill but essentially similar to that of FIG. 1 but in which cartridges are used to support the inserts—this being applicable for larger diameter drills.
Figure 9:
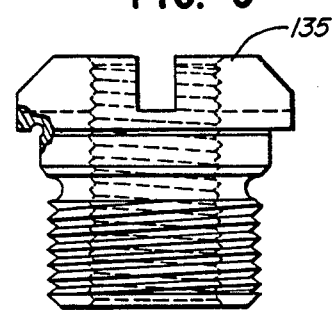
FIG. 9 is an enlarged elevational view of the cartridge lock of FIGS. 7 and 8.
Figure 10:
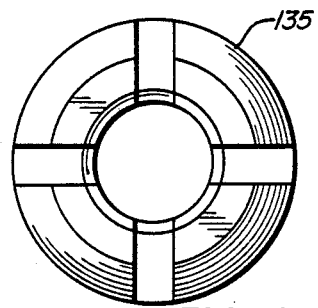
FIG. 10 is an end view of the cartridge lock of FIG. 9.

In operation, the inserts 25 or 125, as the case may be, are mounted in a drill in the fashion shown in FIGS. 1 and 6, respectively. It will be appreciated that for very large size drills, it is possible to mount two inserts per recess.

In any event, one of the inserts is positioned overlapping the axis 21 of the drill 20 and the other insert—as at 25b in FIG. 1—is spaced from the axis so as to have its outer corner developing the wall of the bored hole.

In each case, the operative or cutting sides of the insert 27 and 28 are of unequal length with the shorter sides 28 being positioned adjacent the axis 21. The insert is polygonal in perimeter providing three pairs of sides so that the insert can be rotated from time to time so as to maintain the efficiency of the cut.

The advantage of the inventive drill/insert arrangement is that the unequal length of the cutting sides provides an advantageous balancing of forces so that longer holes can be bored.

While in the foregoing specification a detailed description of the invention has been set down for the purpose of explanation, many variations in the details hereingiven may be made by those skilled in the art without departing from the spirit and scope of the invention.

I claim:

1. A drill haviing an elongated shank for rotation about a longitudinal axis and having a mounting end and a work end adapted to operate in a cutting plane normal to said longitudinal axis, said drill adjacent said work end having two generally radially extending recesses for the receipt of carbide inserts, said recesses being aligned along a diameter of said shank, each insert including a unitary platelike body having a generally polygonal perimeter, said perimeter being defined by six intersecting sides arranged with alternate sides being longer than the sides intermediate the longer sides, each of said inserts being mounted in its associated recess with the shorter of said sides being adjacent said axis and with said shorter side forming an angle of about 16° relative to said cutting plane and said longer side forming an angle of about 10° relative to said cutting plane whereby cutting forces on said insert are substantially balanced.

2. The drill of claim 1 in which two inserts are mounted in each recess.

3. The drill of claim 1 in which each side is equipped with a step to facilitate chip curl and removal.

* * * * *